United States Patent
Garrison Stuber et al.

(10) Patent No.: US 11,917,058 B1
(45) Date of Patent: Feb. 27, 2024

(54) SECURE COMMUNICATION SYSTEM AND METHOD FOR IMPEDANCE INJECTION MODULES DISTRIBUTED ON HV TRANSMISSION LINES

(71) Applicant: Smart Wires Inc., Union City, CA (US)

(72) Inventors: Michael Thomas Garrison Stuber, Newman Lake, WA (US); Paul-Andre Corbeil, Montreal (CA)

(73) Assignee: Smart Wires Inc., Durham, NC (US)

( * ) Notice: Subject to any disclaimer, the term of this patent is extended or adjusted under 35 U.S.C. 154(b) by 340 days.

(21) Appl. No.: 17/340,910

(22) Filed: Jun. 7, 2021

Related U.S. Application Data

(60) Provisional application No. 63/199,123, filed on Dec. 8, 2020.

(51) Int. Cl.
| | | |
|---|---|---|
| *G06F 21/00* | (2013.01) | |
| *H04L 9/08* | (2006.01) | |
| *H02J 13/00* | (2006.01) | |
| *H04L 9/06* | (2006.01) | |
| *H04B 3/54* | (2006.01) | |

(52) U.S. Cl.
CPC ........ *H04L 9/088* (2013.01); *H02J 13/00002* (2020.01); *H02J 13/00022* (2020.01); *H04B 3/544* (2013.01); *H04L 9/0643* (2013.01)

(58) Field of Classification Search
CPC .. H04L 9/088; H04L 9/0643; H02J 13/00002; H02J 13/00022; H04B 3/544
See application file for complete search history.

(56) References Cited

U.S. PATENT DOCUMENTS

| | | | |
|---|---|---|---|
| 10,097,037 B2 | 10/2018 | Inam et al. | |
| 10,790,878 B1 | 9/2020 | Garrison Stuber et al. | |
| 11,329,806 B1* | 5/2022 | Akkaya | H04L 9/0844 |
| 2017/0235286 A1 | 8/2017 | Inam et al. | |
| 2022/0140648 A1* | 5/2022 | Altarjami | H02J 13/00016 700/295 |

* cited by examiner

*Primary Examiner* — Jeffrey C Pwu
*Assistant Examiner* — William A Corum, Jr.
(74) *Attorney, Agent, or Firm* — Womble Bond Dickinson (US) LLP

(57) ABSTRACT

Intelligent impedance injection modules (IIMs) are currently being used for line balancing and overcoming local disturbances on High Voltage (HV) transmission lines of an HV power grid. These distributed IIMs are connected and/or coupled to the HV transmission lines and operate with a pseudo ground at the voltage of the HV transmission line. In order to operate effectively, the IIMs need to communicate with other distributed IIMs across the three phases of the HV grid and also communicate with local intelligent centers LINCs that connect to and synchronize operations across each group of the distributed IIMs in a local region of the HV power grid. Systems and methods are presented for effective and secure sub-cyclic speed communication to and from the distributed IIMs, distributed IIMs to LINCs and substations to enable coordinated actions. Further the distributed IIMs and LINCs receive GPS signals and use the GPS clock for synchronizing operations.

21 Claims, 8 Drawing Sheets

SPECIFICATION
IS.05 915MHz Hercules ISM Band Antenna

| | |
|---|---|
| Part No. | : IS.05.B.301111 |
| Product Name | : 915 MHz Hercules ISM Band Antenna Screw-mount (Permanent mount) |
| Features | : • Low profile -Height 29mm and diameter 52mm |
| | • Heavy duty screw mount |
| | • UV and Vandal resistant ABS housing |
| | • IP67 – Waterproof |
| | • Standard cable – 3m RG174 with SMA(M)-connector fully customizable |
| | • ROHS Compliant |

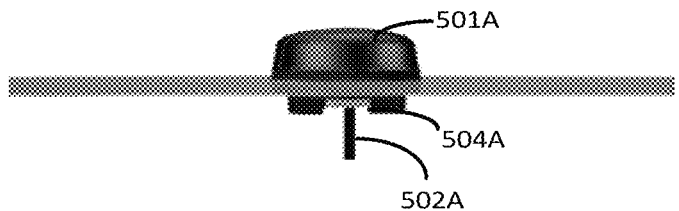

Fig. 5A

Specification

| | |
|---|---|
| Part No. | : WS.02.B.205111 |
| Product Name | : 4dBi 2.4GHz Omni-Directional Heavy Duty Screw Mount Antenna |
| Features | : Wi-Fi/ISM Bands/ZigBee/WLAN/ Bluetooth |
| | UV and Vandal Resistant ABS Housing |
| | Cable length and connector customizable |
| | IP67 & IP69K Waterproof Rating |
| | 2M CFD-200 SMA(M) – Standard |
| | RoHS Compliant |

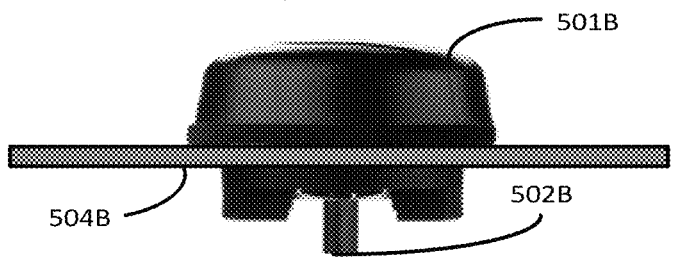

SECURE COMMUNICATION SYSTEM AND METHOD FOR IMPEDANCE INJECTION MODULES DISTRIBUTED ON HV TRANSMISSION LINES

CROSS REFERENCE TO RELATED APPLICATIONS

This application claims the benefit of U.S. Provisional Application No. 63/199,123 filed on Dec. 8, 2020, the disclosure of which is incorporated herein by reference in its entirety.

TECHNICAL FIELD

The present disclosure relates to secure communication capability for communication for data and control to and from FACTS based device such as impedance injection modules (IIMs) distributed on a power grid operating at a high voltage of the grid for power flow control and correction of disturbances.

BACKGROUND

FIG. 1 shows a conventional power grid 100 that includes power generation units 103 and loads 105 connected to sub stations 104. Power is transferred to loads 105 from generators 103 over the high voltage (HV) transmission lines 108 suspended from HV transmission line towers 101. Balancing of the power flow over the HV transmission lines 108 is handled using static synchronous series compensators (SSSC) 109 at substations 104 controlled by a central utility 106. The central utility 106 receives information on power flow and line disturbances over communication links 107. The central utility 106 processes the received data and provides control instructions to the SSSC 109 at substations over the communication link 107.

More recently distributed intelligent impedance injection modules (IIMs) 102 are currently being used for line balancing and overcoming local disturbances as shown in HV grid system 200 of FIG. 2. These IIMs 102 are distributed and connected to segments of the high voltage (HV) transmission line 108 and operate with a pseudo ground at the voltage of the HV transmission line 108. These distributed IIMs 102 also operate under control and in communication with substations 104 and the central utility 106.

In order operate effectively, the distributed communication enabled FACTS based control devices such as distributed IIMs 102s may be provided with intelligence comprising sensing capability, processing capability and response capability built in, for identifying, defining corrective action and responding to power flow and other problems in the local segments of the power line to which they are connected, with sub-cyclic speed (high-speed where the speed is faster than the cycle time of the AC power transfer) communication capability linking the IIMs 102 to other neighboring IIMs 102 distributed over the HV transmission lines 108 and across the three phases of the HV grid system 100. This communication linkage may be direct or through the communication enabled local supervisory capability provided through the local or localized Intelligent centers (LINCs). The operation of IIMs and LINCs with sub-cyclic speed communication capability is described in U.S. Pat. No. 10,097,037, the disclosure of which is incorporated herein by reference in its entirety. However, there is a need for the IIMs to operate efficiently and to establish secure communication with the substations and the central utility.

SUMMARY

One exemplary aspect of the subject technology relates to the capability of the distributed communication enabled distributed FACTS devices such as IIMs to operate in a synchronized fashion with the other IIMs, which may use a local synchronizable clock capability on each IIM. The distributed IIMs may communicate with the substations and the central utility to receive and respond to control instructions from the substations and central utility 10. The communication system may establish strong security capabilities for the communication system to prevent unauthorized access to the power grid system.

Another aspect of the subject technology relates to the capability for the communication to operate efficiently while suspended from the HV transmission lines at the voltage of the HV transmission lines. The communication capability established within the IIMs may be able to communicate from within the IIM in secure fashion and not be impacted by the high voltage and corona that may surround the IIMs.

One aspect of the subject technology relates to a method for secure communication between an IIM and a localized Intelligent Center (LINC) of a power grid system. The method includes the IIM receiving from the LINC a nonce challenge including an absolute slot number (ASN) that indicates a specific time when the nonce is transmitted by the LINC and an encrypted ID of the LINK, encrypted using an encryption based on the seed-key of the IIM. The method also includes the IIM determining an elapsed time based on a time when the nonce challenge is received and the ASN. The IIM further decrypts and verifies the ID of the LINC. In response to the elapsed time, if it is determined to be less than a pre-set threshold value and the LINC is successfully verified, the method further includes the IIM sending a nonce with an identifier (ID) of the IIM and an authentication value (AV), encrypted to the LINC, to be verified by the LINC Once and the ID and AV of the IIM (102) are checked and validated by the LINC, resulting in a mutual verification of identities, a secure connection is established between the LINC and the IIM. This enable the generation and transfer of encrypted session keys between the IIM and the LINC for future enablement of secure communications.

One aspect of the subject technology relates to a method for secure communication between a LINC and an IIM of a power grid system. The method includes sending by the LINC to the IIM a nonce challenge including an absolute slot number (ASN) that indicates a specific time when the nonce is transmitted by the LINC. The nonce challenge may also contain a random number and an authentication value. The nonce challenge is sent encrypted using an encryption based on the seed-key of the IIM available to the LINC. The method also includes receiving by the LINC from the IIM a response nonce with an identifier (ID) of the IIM and an authentication value of the IIM all encrypted based on the seed-key of the IIM. The method further includes verifying by the LINC the ID and the encrypted seed-key of the IIM and after the successful verification establishing a secure connection with the IIM.

BRIEF DESCRIPTION OF THE DRAWINGS

The drawings and tables are made to point out and distinguish the invention from the prior art. The objects, features and advantages of the invention are detailed in the description taken together with the drawings. The drawings and descriptions of the embodiments accompanying the drawings are illustrative of the invention and are not intended to limit the scope of the invention.

FIGS. 5A and 5B are diagrams showing two example communication antennae used for short range and medium/long range communication from impedance injection modules attached to the HV transmission line, according to an embodiment of the subject technology.

DETAILED DESCRIPTION

Examples of various aspects and variations of the subject technology are described herein and illustrated in the accompanying drawings. Objects, features, and advantages of the invention will be apparent from the following detailed description taken in conjunction with the accompanying drawings. While various embodiments of the subject technology are described, the following description is not intended to limit the invention to these embodiments, but rather to enable a person skilled in the art to make and use this invention.

FACTS based monitoring and control modules that are communication enabled Intelligent impedance injection modules (IIMs) are currently being used for line balancing and overcoming local disturbances on High Voltage (HV) transmission lines of the HV power grid. These distributed IIMs are connected and coupled to the HV transmission lines and operate with a pseudo ground at the voltage of the HV transmission lines. In order to operate effectively the monitoring and control modules such as IIMs may need to communicate with other distributed FACTS based controllers and IIMs across the three phases of the HV grid and also communicate with local coordinating modules such as local intelligent centers (LINCs) or substations that connect to and synchronize operations across each group of distributed FACTS based controllers and IIMs in a local region of the HV grid. Systems and methods are presented for effective and secure sub-cyclic speed communication within the distributed FASCTS based modules such as IIMs, between distributed IIMs on the HV transmission lines, and LINCs or substations comprising the power grid to enable coordinated actions. Further the distributed IIMS and LINCs receive GPS signals and use the GPS clock for synchronizing operations.

Figure 1:
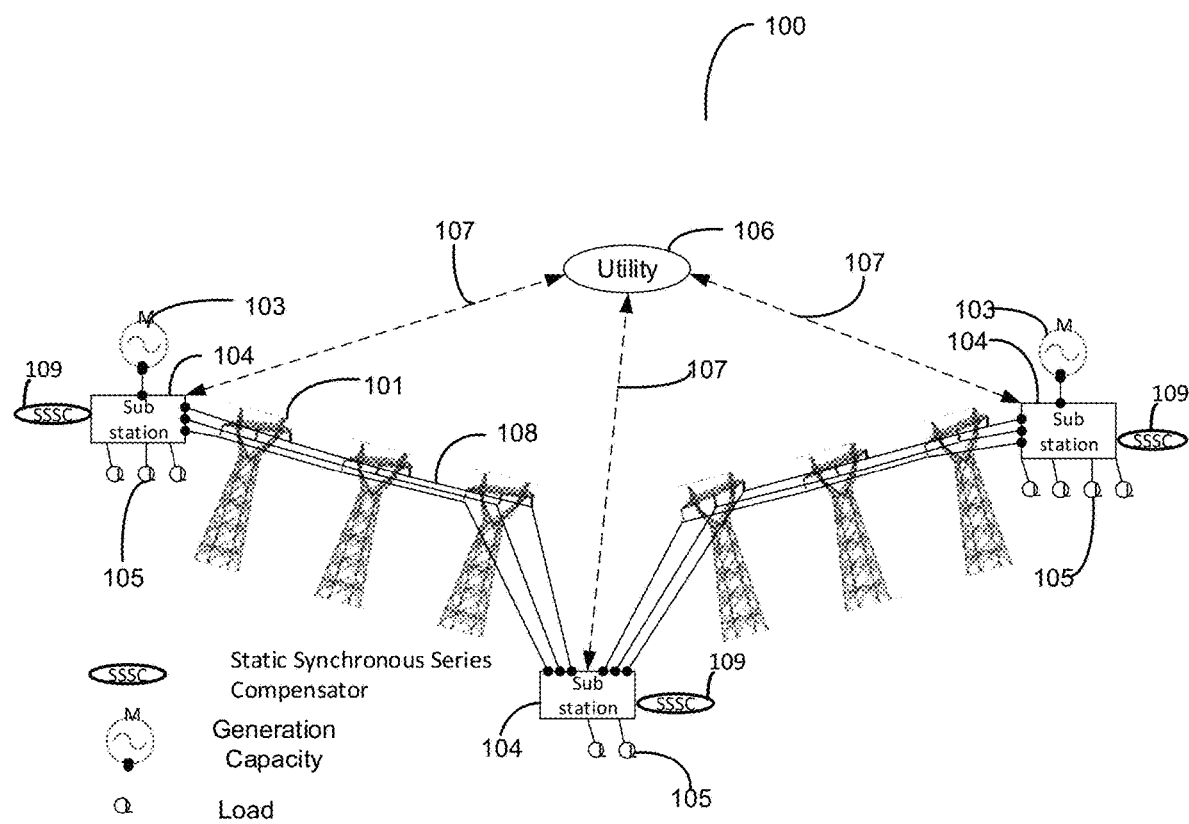
FIG. 1 is a block diagram of a conventional power grid with power flow control using static synchronous series compensators (SSSCs) installed at the substations.
Figure 2:
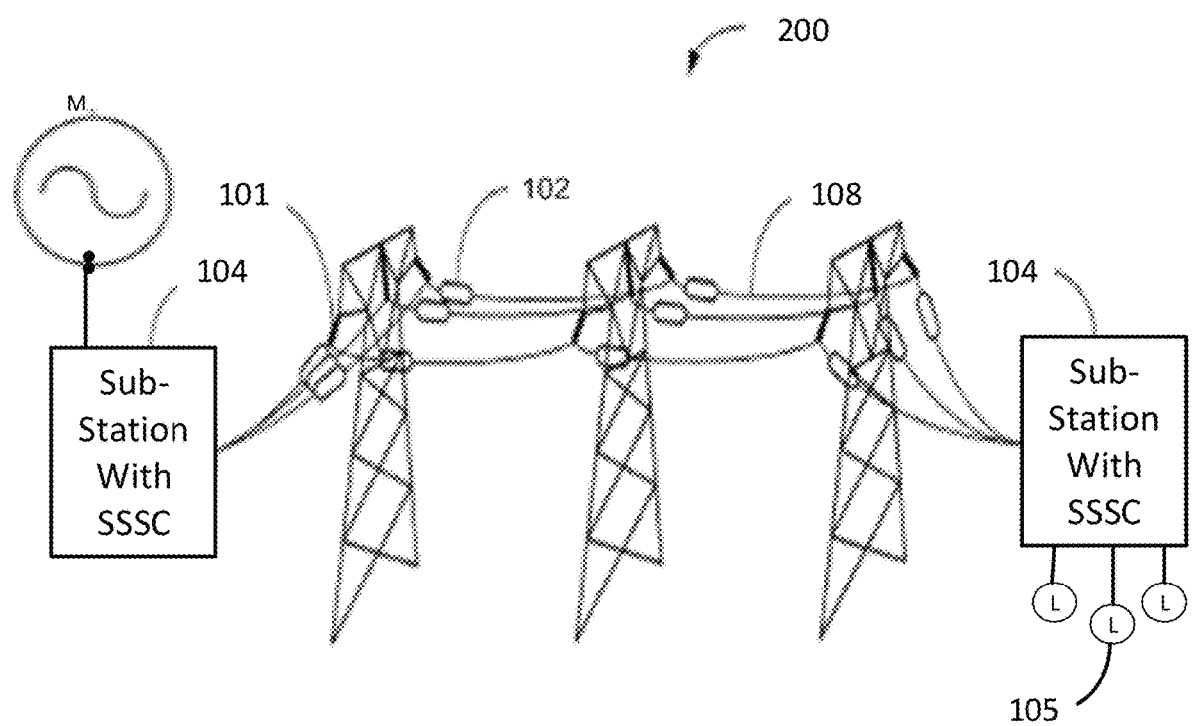
FIG. 2 is a representation of a conventional power grid with distributed impedance injection modules.
Figure 3:
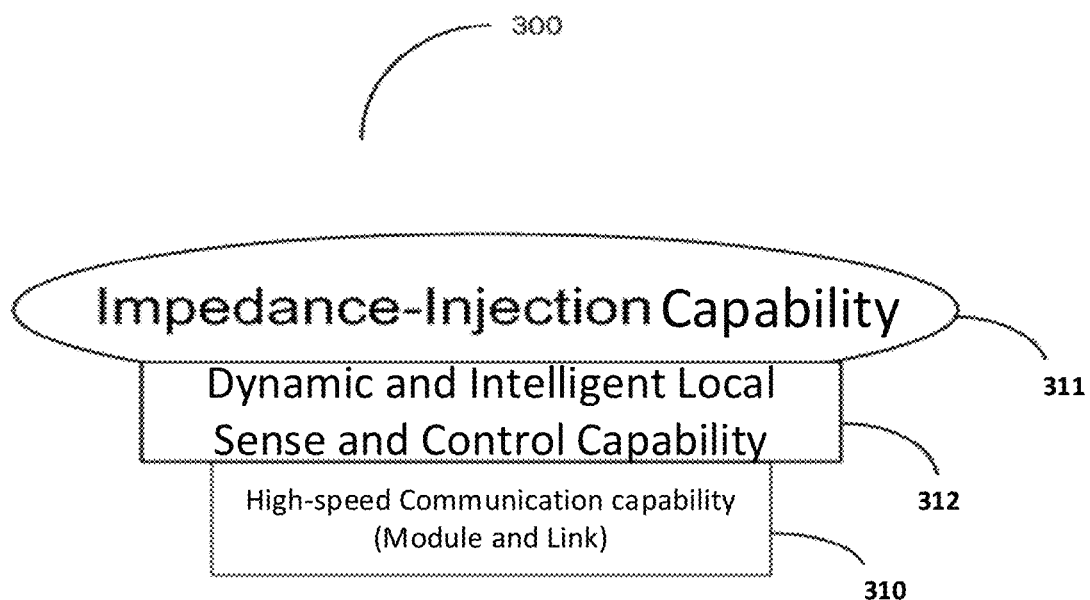
FIG. 3 is a block diagram representation of an intelligent impedance injection module with high-speed (sub-cyclic speed) communication capability, according to an embodiment of the subject technology.

FIG. 3 shows an improved FACTS based IIM 300 that includes intelligence to locally recognize, control and respond to any sensed and recognized power flow discrepancies and other disturbances on HV transmission lines 108 of a power grid, according to an embodiment of the subject technology. The improved intelligent and communication enabled IIM 300 typically comprises impedance/voltage injection capability 311. These IIMs 300, typically comprises transformer-less flexible alternating current transmission system (FACTS) based units for voltage impedance generation and injection on to the local high voltage (HV) power line 108 segments to which they are coupled. The IIM 300 operate by extracting power from the HV powerline 108 segments. The IIM 300 also includes sensing and processing capability for at least one dynamic intelligent local sense and control capability 312 that can sense power flow changes, oscillations and other disturbances over the power line on which the distributed IIM 300 is attached and respond intelligently to the sensed changes and disturbances. The IIM 300 also comprises a high-speed (e.g., sub-cyclic speed-relative to power line frequency) communication capability 310 enabled to securely communicate using a plurality of communication frequencies, e.g., 915 MHz and 2.4 GHz with neighboring distributed IIMs 300, and other connected power grid system components for coordinating their responses together. The frequencies selected are also chosen based on their reduced interference from the corona discharge around the distributed IIMs 300 as they operate. The high-speed communication capability 310 may also include the capability to connect a local clock to global positioning system or satellite for synchronizing action of the IIM 300 using global timing.

Though radio frequency communication is described herein, it is not meant to be limiting in any way. The described example does not preclude the use of other high speed communication methods, such as optical communication over fiber or power line communication (if it can be done at acceptable speeds without impacting the stability of the power grid system).

As discussed, the IIM 300 may synchronize the activity of the various components to achieve the required response to sensed changes in power flow and other sensed disturbances on the HV transmission lines 108. This is done by either synchronizing the internal local clock of the distributed IIMs 300 using the method of synchronizing to the Global System for Mobile Communication (GSM) cellular system clock or using a master clock in the LINC 302 locally, for all other clocks in the distributed IIMs 300 to be slaved to the master clock.

Figure 4:
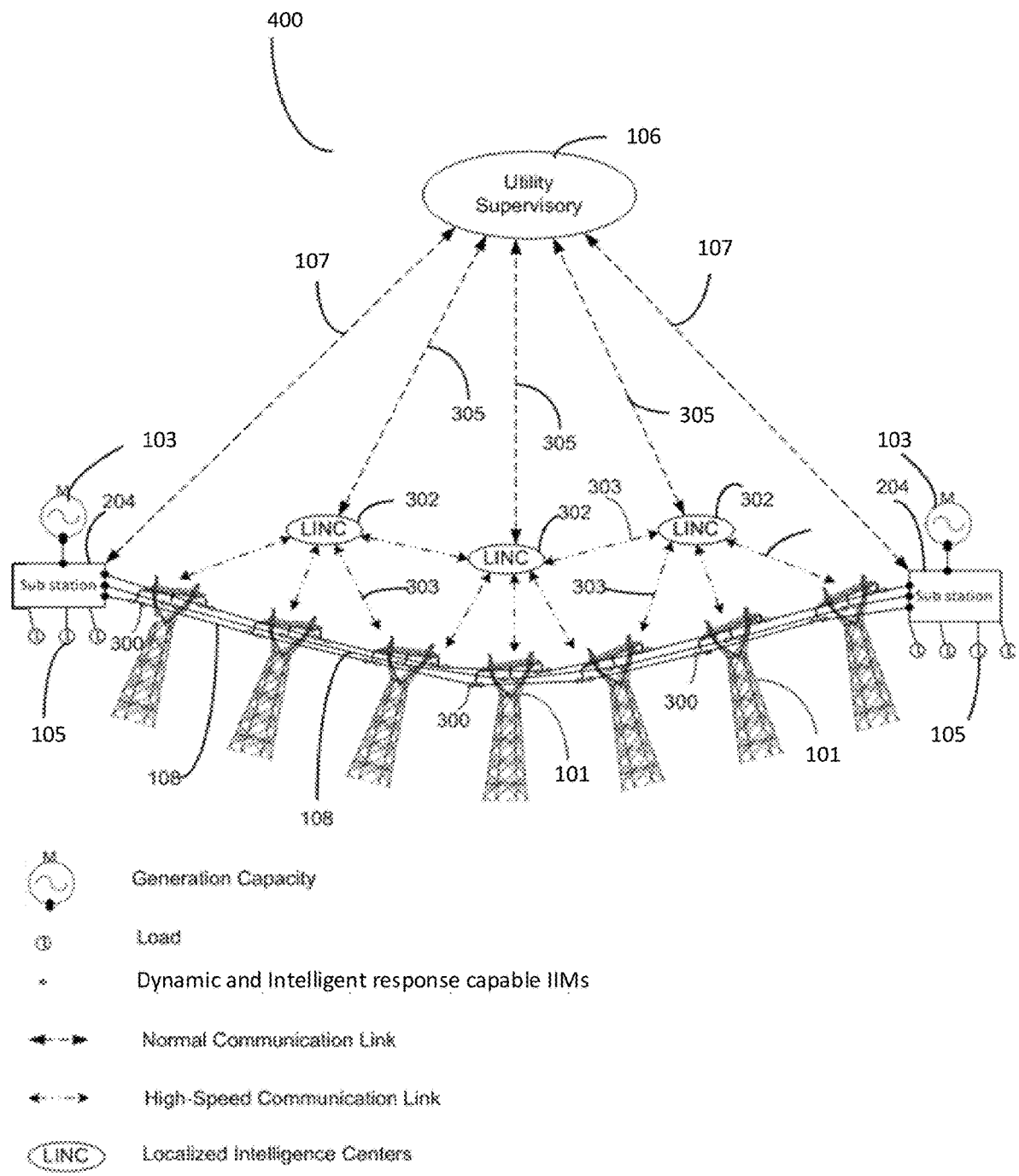
FIG. 4 is a diagram showing an example hierarchical system communicably connected using speed communication capability for control of a power grid, according to an embodiment of the subject technology.

FIG. 4 shows an example hierarchically controllable HV power grid 400 according to an embodiment. In FIG. 4, HV power grid 400 comprises power generators 103 and load circuits 105 connected to sub-stations 204. The power grid 400 comprises at least the three phases that use individual HV transmission lines 108 suspended from HV transmission line towers 101 to transfer power from generators 103 to loads 105. For optimizing the operational efficiency of the power flow between the generators 103 and loads 105, the system has to operate in a balanced and stable manner. This may require power flow control capability, oscillations damping capability and capability for recovery from disturbances on the power lines. In the hierarchically controlled HV power grid 400, this control and response are typically handled at local HV power line segments using the individual distributed IIMs 300 attached to those HV transmission line segments. Though in an embodiment the control and response are local, it does not have to be so. For example, in another embodiment, it can also be done by use of mobile units with the IIMs 300 connected and coupled to an HV transmission line at specific locations or with groups of IIMs installed at substations. As discussed in an embodiment, each distributed IIM 300 is enabled to sense and generate a response to any sensed change in power flow, oscillation or disturbance, sensed on the power-line segment. If the change or disturbance is not controllable by the impedance generated and injected by the local individual IIM 300 (e.g., by impedance injection capability 311), the IIM 300 is able to communicate at sub-cyclic speed over high speed link 303 with a local intelligence center (LINC) 302 (e.g., by high-speed communication capability 310), which is enabled to coordinate the responses of a group of local area IIMs 300s distributed over the HV transmission line and communicably coupled to it over the high speed links 303 for communication at sub-cyclic speed. In the event that the locally available group of distributed IIMs 300 associated with a single LINC 302 is not able to provide the necessary response capable of controlling the sensed change or disturbance, the LINC 302 is also able to communicate, for example at sub-cyclic speed, with neighboring LINCs 302 over high speed links 303, to bring in additional impedance injection resources, such as additional IIMs 300 associated with the neighboring LINCs 302 to respond to the power flow change, oscillations or disturbance sensed on the HV power transmission lines 108. The LINCs 302 are also in communication with a utility supervisory 106 providing status over communication link 305 where if the change or disturbance is assessed by the utility supervisory 106 to be beyond the local control capability, the utility supervisory 106 can take over and provide central control instructions to the substation and the connected generators 104, and loads 105 over communication link 107 and further provide control instructions to the distributed FACTS based control units and IIMs 300 and LINCs 302 over link 305 for corrective action to overcome any problems of the power grid 400. The power grid further comprises an optimization module that is coupled to the supervisory utility and enabled to receive real time inputs from any sensors and FACTS based controllers to provides the power grid operating instructions to meet pre-set objective functions to be achieved by the power grid. In the described embodiment of the hierarchical control and communication capability, the LINCs 302 act as the gateway between the distributed IIMs 300 and the sub-stations, the utility supervisory 106 and other communication-enabled controllers within and at the edge of the power grid 400.

In addition to the established hierarchical control capability using the secure sub-cyclic communication, the high-speed communication capability 310 within the distributed IIM 300 also enables a very short range secure communication link across the distributed IIMS 300 on the three phases of the HV power grid 400 to sense and respond to power flow changes over the HV transmission lines carrying power over the three phases. This messaging capability is described in the co-pending application Ser. No. 16/209,762, assigned to the current assignee, entitled "SYSTEMS AND METHODS FOR REAL-TIME COMMUNICATION AMONG A CLUSTER OF IMPEDANCE INJECTION NODES IN A POWER DISTRIBUTION SYSTEM," the disclosure of which is incorporated herein by reference in its entirety.

Since the distributed IIMs 300 are suspended on the HV transmission lines 108 of the HV power grid 400 and operate at the high voltage of HV transmission lines, they introduce a number of constraints on the high-speed communication capability 310 established. The high-speed communication capability 310 may be implemented using a communication module. The constraints include, but are not limited to:

1) a capability for the communication modules to work within the distributed IIMs 300 at the HV transmission line voltage with a pseudo ground,
2) operate with power extracted from the power line and be immune to power line disturbances,
3) a capability to work within a high voltage corona ring of the distributed IIM 300 using frequencies that are not impacted in an adverse manner by the corona discharge,
4) one or more antennae installed in such a way to prevent points for concentration of high voltage and generation of corona,
5) requirement of very high reliability for communication modules as replacement and repair require bringing down the distributed IIMs 300, impacting the operation of the power grid 400, and
6) provide security for all communication links to prevent un-authorized access to grid.

In some embodiments, the high-speed communication capability 310 can be achieved using radio frequency (RF) transmission or optical transmission.

Figure 5:
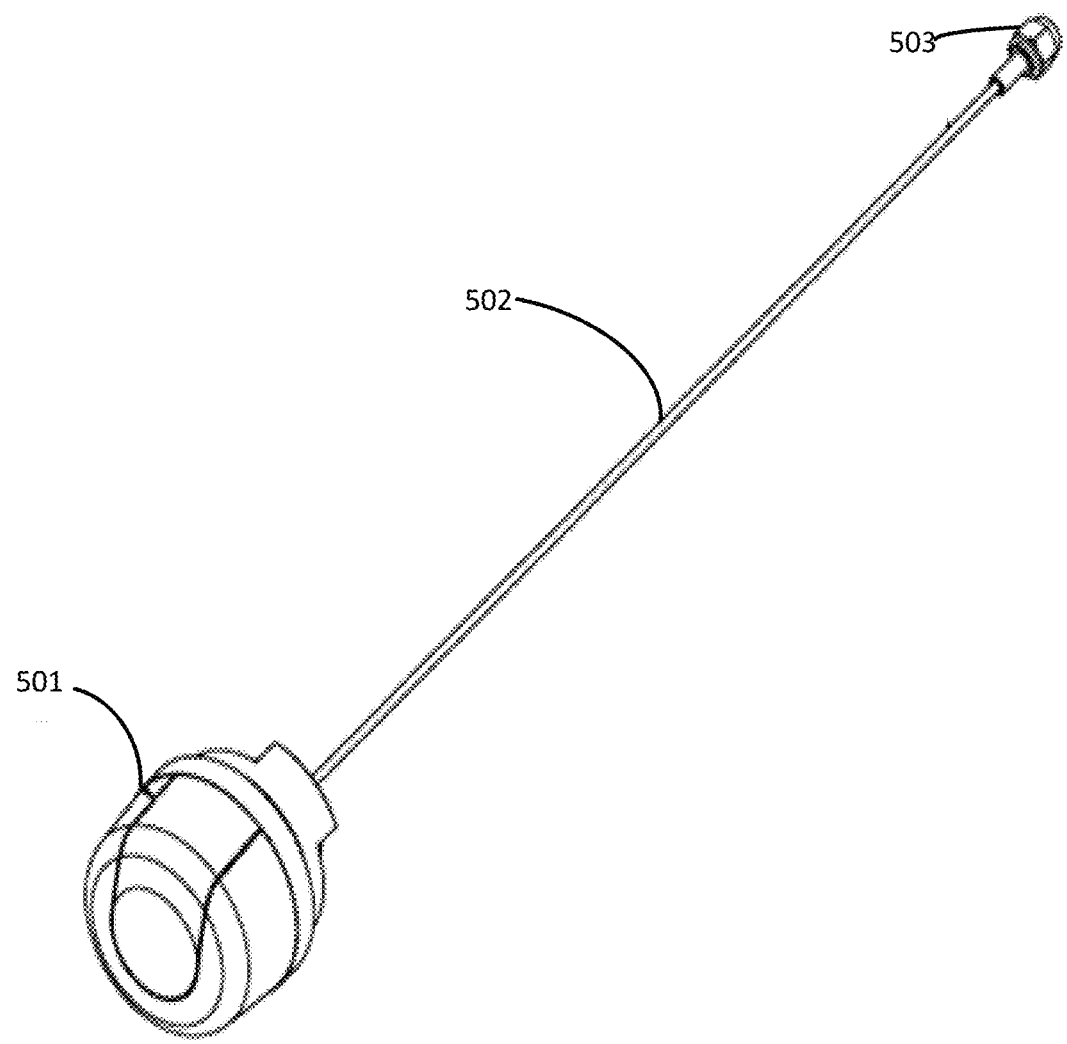
FIG. 5 is a diagram showing an antenna used on an impedance injection module, according to an embodiment of the subject technology.

FIG. 5 shows a typical antenna (not to be considered limiting to the type of antenna shown) used on a distributed IIM 300, according to an embodiment of the subject technology. FIGS. 5A and 5B provide the specification of a 915 MHz and 2.4 GHz antennae, respectively, used with the two groups of industrial, scientific and medical (ISM) bands with the structure and connection capability to the distributed IIM 300 and the communication module within the distributed IIM 300. In an embodiment, the antenna includes an antenna head 501 (e.g., 501A of FIG. 5A or 501B of FIG. 5B) that is exposed outside the distributed IIM 300 but fixed to the outside casing by lock nuts 504 (e.g., 504A of FIG. 5A or 504B of FIG. 5B). A cable 502 (e.g., 502A of FIG. 5A or 502B of FIG. 5B) of a length with an end connector 503 is used to attach it to the communication module within the IIM 300. In an embodiment, the antenna in FIG. 5B is for communication with the neighboring distributed IIMs covering short distances across the three phases of the power system. This antenna may use the ISM frequency range of 2.4 GHz as an example. The antenna in FIG. 5A may use 915 MHz ISM frequency range to connect to the LINCs 302, and other FACTS based sense and control devices on the HV grid 400, while a third low profile antenna used is a GPS antenna (not shown) for getting the global clock signal for synchronization of the local clock across all the distributed IIMs 300 from the global position system (GPS). In an embodiment, distributed IIM 300 may have two of each of the 915 MHz (FIG. 5A) and 2.4 GHz (FIG. 5B) antennas and one instance of a GPS antenna. The antennae shown in the figures and described herein are all shown and described as examples only. Other antennae from other manufacturers meeting the operational criteria may be used to meet specific requirements and needs of the customers.

In some embodiments, the antennae described herein may have low external profiles that are smooth and round to reduce HV potential concentrations at the antenna heads and related formation of corona. The low-profile of the antennae ensure that the antennae are within the corona ring of the distributed IIMs. In an embodiment, the types of antennae used on the IIM 300 are omnidirectional antennae, though this is not meant to limit the use of other types of antennae.

Figure 6:
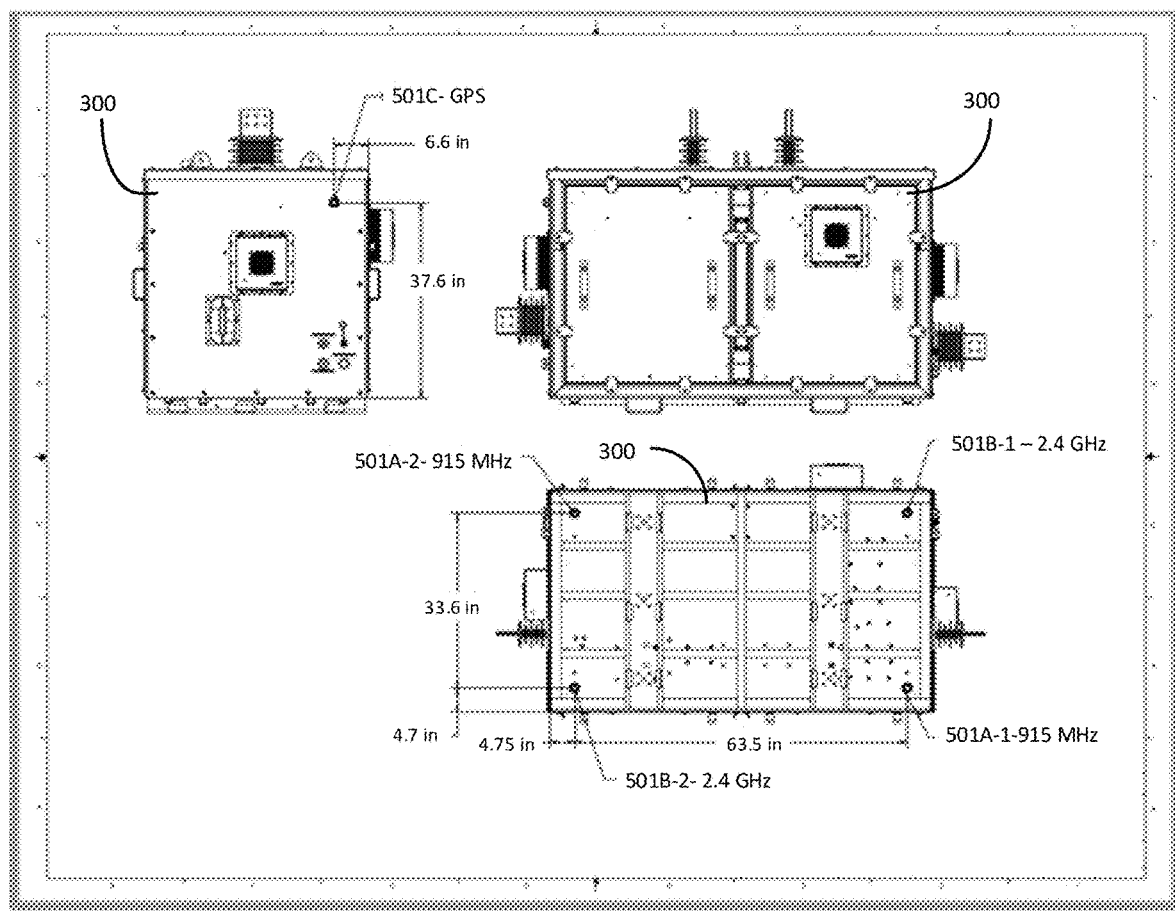
FIG. 6 is a diagram showing layout and position of antennae, two each for short range communication and medium/long range communication and one for GPS connection on the impedance injection module, according to an embodiment, according to an embodiment of the subject technology.

FIG. 6 shows a distributed IIM 300 layout with example antenna positions defined on the outside of the module, according to an embodiment of the subject technology. As previously described, there are two antennae each for 915 MHz links shown with their heads fixed at positions 501A-1 and 501A-2, and two antennae for 2.4 GHz links shown at positions 501B-1 and 501B-2, a GPS antenna shown at 501C to connect to the GPS satellite on the case of the distributed IIM 300. These antenna heads are distributed over the outside of the distributed IIM 300 to prevent them from being shielded by the metal enclosure of the distributed IIM 300.

The communication protocols established for implementation in the distributed IIMs 300 may include security protocols that are designed to prevent disruption of the grid system 400 by hacking into the communication links of the HV power grid.

The short range communication using the 2.4 GHz links that cater to the sub-cyclic performance requirements of the application use simpler security protocols that can be processed fast. These internationally recognized cryptographic algorithms are typically cyber security protocols for secure hash algorithm (SHA) such as SHA-1, SHA-2 (SHA-256) and SHA-3 approved by the National Institute of Standards and Technology (NIST). These fast algorithms are usable for short messages to be sent securely over the short distances interlinking the distributed IIMs 300 in the neighboring three phases of the grid system 400. The use of these fast processing algorithms enables the sub-cyclic speed response by the IIMs 300, coupled to the three phases of the grid within a local area or neighborhood, to disturbances and power flow changes sensed on a transmission line segment.

For the medium/long range communication links (e.g., links 303) connecting the distributed IIMs 300 to LINCs 302 and other FACTS based sensors and controllers within and at the edge the grid and to substations, the 915 MHz ISM frequency band may be used. The ISM antenna of FIG. 5A used on the distributed IIM 300 may be an omni-directional antenna and the antenna at the fixed stations, such as at the edge of the grid, LINCs 302 and substations 104, may be focused beam antennas to enhance and improve the communication capability over the associated links 303.

The communication modules in the distributed FACTS based IIM 300, similar to the rest of the circuits in the distributed IIMs 300, operate by extracting power from the HV transmission line with a pseudo-ground at the high voltage of the transmission line when the distributed IIM 300 are distributed and attached to the HV power transmission lines 108 of the power grid 400 when they are in operation. This creates specific constraints in establishing security for communication as any changes, additional insertions/key inputs or maintenance required from outside for secure communication enablement, as is done for typical ground based communication systems, may need the distributed IIM 300 and hence the whole power line/power grid section to be powered down for handling the changes, thereby disrupting the power delivery over the HV transmission lines 108 of the HV power grid 400.

The longer range communication network can use either a one hop (flat network) or a mesh architecture (providing redundancy) for connecting the plurality of FACTS based controllers at the edge of the grid, the IIMs 300 and the LINCs 302 together with capability to relay messages. The LINCs 302 in addition act as gateways to system utility (e.g., utility supervisory 106) and substations 204. To ensure end-to-end security each connection in the system has to be made secure. The security implemented for the high speed (sub-cyclic) longer-range communication may use full hash-based message authentication code (HMAC) security protocol with key exchange. The full HMAC uses a message digest with uniform resource identifier and time stamp and other header information creates an authentication digest using the secret key. The key identifier with the digest may be encoded and sent with the authentication header. There are different levels of HMAC security. Depending on the security needs of the customer, the HMAC security used may be the highest level available or a reduced lower security level provided by SHA-1. For end-to-end security, in an embodiment, each of the links is independently secured. Each of these links represents a separate security domain for which independent sets of keys are also established and managed, and messages are encrypted and secured. The system uses cryptographic keys for high security. In an embodiment, the security protocol is a full HMAC (e.g., SHA-256), though this is not meant to be limiting. Other protocols, such as asymmetric key exchange protocol ECC-256 or ECC-384 or others can be implemented based on customer needs and choices for both short hop and long distance communication.

In the case of the FACTS based devices such as distributed IIMs 300, after their distributed physical installation over the HV power grid, they are not easily accessible to load new cryptographic keys. Hence, in such cases the IIMs 300 may be provided with secured seed-keys at the factory which are supplied to the customers with the IIMs 300. These initial seed-key of the IIMs are provided to the local intelligent centers (LINC) that are communicably connected for local coordination and control of the connected FACTS based node devices, such as IIMs 300. These are then replaced by the customer after installation of the units, with generated random keys that are secure during the authentication process, enabling full HMAC security during operation. The seed-keys themselves are provided to the customer encrypted using a customer specific pass-phase.

The message between the local IIMs 300 forming the nodes in the mesh network are typically sent hop-to-hop and secured using keyed HMAC using only a secure group key. In an embodiment, if a message is found to be not validatable, it is dropped by the mesh node and the message is resent by the previous node via an alternate path. When communicating with LINCs 302, the full HMAC keyed security is engaged to prevent hacking and man-in-the-middle attacks. The use of group keys for multi-hop message transmission though possible, is typically discouraged due to security considerations of the group keys. But the keyed HMAC using group key is applicable for LINCs 302 communicating in broadcast mode to all communicably connected distributed IIMs 300. In cases where additional security is mandated during multi-hop transmission, in addition to hop-by-hop security, which is done with the group key, end-to-end security is added, which is done with the device specific unique keys. As a result, it is possible to both move a packet securely across the network with dual keys, group key and individual keys, with each node validating the received packet and re-writing the packet. This process enables movement of the packet from the sender to the receiver without any concern that an intervening node may change the contents.

Set up and mutual validation for full HMAC with key exchange may proceed as follows:

During the manufacturing process the nodes, for example each of the communication enabled FACTS based devices coupled within and at the edge of the high voltage power grid, such as distributed impedance injection module (IIM) 300, may be given a unique n-byte (e.g., 16-byte, though not to be considered limiting) cryptographically random value as the seed-key. During installation this seed-key is used to establish the authentication and establish the trust relationship with other communicably connected network nodes. The nodes will then start frequency hopping relationships within the network. At some point the LINC 302 may send out to each of the connected nodes a nonce challenge (e.g., a single time use number) which includes an absolute slot number (ASN) of the network at a point of time 't1' and a sender identifier (ID) and address cryptographically encrypted based on the seed-key of the FACTS device, such as IIM 300, at the connected network node. On receiving the nonce the receiving node, e.g., IIM 300, may extract the ASN and the time delay between the time the ASN was valid on network and the time of receipt based on an elapsed time. A decision to accept or reject the challenge is made by each node based on a threshold elapsed time. If the elapsed time is within the acceptance threshold, the receiving node accepts the nonce and verifies the sender ID. If verified the receiving node sends a response back with its own response-nonce with its ID and an authentication value (AV) cryptographically derived from the nonce and the seed-key already available to the device. If the sending LINC 302 that sent out the original challenge-nonce can establish that the response includes correct authentication value based on the seed-key provided to the IIM 300, then the IIM 300 and LINC 302 are authenticated to each other for generation of new ephemeral keys and updating the keys and establishing a trust base and secure communication using full HMAC-SHA-256 with secure key exchange. The LINC 302 and the IIM 300 are then able to generate and exchange secure session keys to establish secure communication with HMAC-SHA-256 with key exchange.

Even though the embodiment of secure communication has been described using HMAC security protocols, such embodiment is only an example and is not to be considered limiting. Other security protocols may be implemented as effectively. These may include, for example, protocols using asymmetric encryption, such as ECC-256 or ECC-512.

Once the IIMs 300 of the mesh network are authenticated to the appropriate LINCs 302, a secure group key is also established for each mesh group for hop-to-hop communication within the mesh using HMAC-SHA-256 security.

Figure 7:
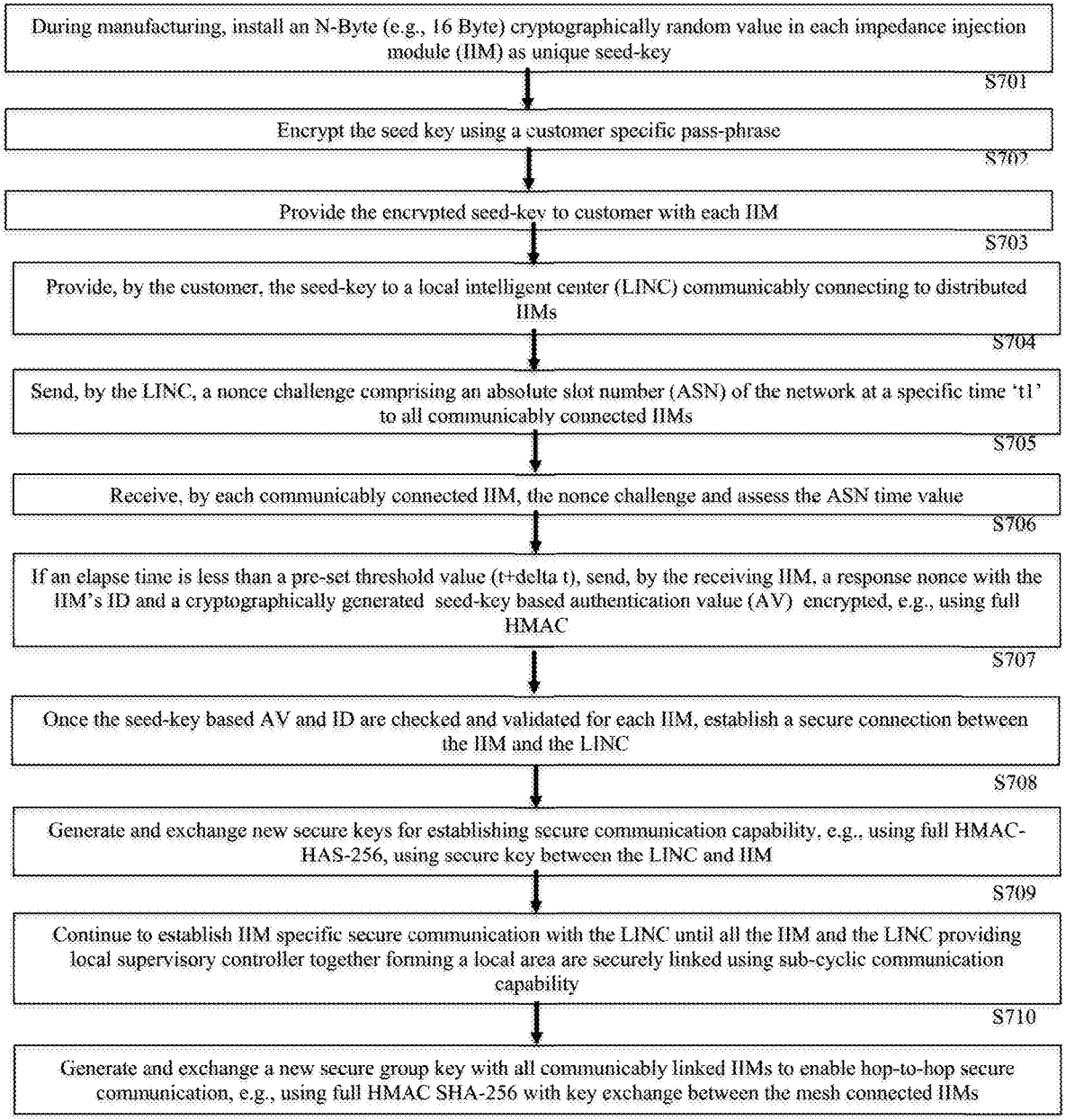
FIG. 7 is a flow chart showing a process for setup and seed-key based establishment of an HMAC-SHA-256 key exchange security on an impedance injection module installed on an HV transmission line according to an embodiment, according to an embodiment of the subject technology.

FIG. 7 is a flow chart showing an example process of setup and validation of IIMs 300 connected to each LINC 302 for full HMAC-SHA-256 with key exchange, according to an embodiment of the subject technology.

In an embodiment, the process starts during manufacture when a unique seed-key is provided to each IIM at operation S701. In addition, a unique ID is established for each IIM linked to the seed-key. The seed-key may be an N-byte long key (e.g., 16 Byte in length) that is a cryptographically random value installed in each impedance injection module (IIM 300).

At operation S702, the unique seed-key may be encrypted using a customer specific pass-phrase. The customer specific pass-phrase can be used for all units, e.g., IIMs 300, provided to the specific customer.

At operation S703, the unique encrypted seed-key encrypted using the customer specific pass-phrase is provided to customer along with each IIM 300 supplied.

At operation S704, the seed-key and ID of the IIM 300 is provided by customer to the local intelligent control (LINC 302) communicably connecting to each of the distributed IIMs 300 as the IIM 300 is installed.

At operation S705, the LINC 302, providing a local supervisory control that is communicably connected to all the distributed IIMs 300 of the local region controlled by the LINC 302, sends out a nonce challenge to each of the connected IIMs comprising at least an encrypted ID of the LINC 302 encrypted based on the seed-key of the IIM 300 and an absolute slot number (ASN) of the network at a specific time 'l1' to all communicably connected IIMs 300 connected to the LINC 302.

At operation S706, each communicably connected distributed IIMs 300 connected to the LINC 302 receives the nonce, decrypts and verifies the ID of the LINC 302 and assesses the ASN time value when the nonce was received by the IIM 300 as (t1+tr).

At operation S707, if the time elapse based on (t1+tr) is less than a pre-set threshold value of (t+delta t), then the receiving IIM 300 sends its own response nonce with its ID and a cryptographically generated authentication value (AV) generated based on the seed-key, encrypted, e.g., using full HMAC, back to the LINC 302 for verification.

At operation S708, once the seed-key based AV and ID are received by the LINC 302, they are checked and validated for each IIM 300, by the LINC 302. Once validation is completed a secure connection is established between the IIM 300 and the LINC 302. S08

At operation S709, new secure session keys are generated for each IIM-300 and exchanged to establish a fully trusted secure communication capability using full HMAC-SHA-256 using the new secure key exchanged between LINC 302 and the specific IIM 300. It is noted that any other appropriate security protocols can be used instead of HMAC-SHA-256 in this process to establish secure communication capability between the LINC 302 and IIM 300.

At operation S710, the process comprising S701 to S709 to establish IIM 300 specific secure communication with the LINC 302 is continued until all the IIMs 300 and the LINC 302 providing local supervisory control are communicably linked together over secure sub-cyclic links forming a local area group that is securely linked using sub-cyclic communication capability. This process is further repeated until all distributed IIMs 300 are communicably linked as local area groups with their respective LINCs 302s.

At operation 711, a new secure group key may also be generated and exchanged with all communicably linked IIMs 300 and LINCs 302 to enable hop-to hop secure communication using full HMAC SHA-256 with key exchange between the mesh connected IIMs 300.

Upgrading seed-key to a recovery-key (for re-authentication) by the customer in case of corruption of the seed-key or a need to change the seed-key may proceed as follows: In an embodiment, it may be necessary to have a means or way to enable the IIM 300 to be re-authenticated in case of a communication link authentication failure during operation. Customers may not desire to keep the factory loaded seed-key once the IIM 300 has been validated, as it can be a point of weakness in the secure network. Hence, a method to change the seed-key stored to a recovery key is provided. For example, the utility management in system utility (e.g., utility supervisory 106) can define a recovery key for each installed IIM 300. Once the IIMs 300 are authenticated to the respective LINCs 302, and hence to the system utility, a capability is provided for the customer to update and change the seed-key of each of the IIM 300 by the unique recovery-key defined by the system utility. This recovery key can enable the secure communication capability to be re-established in case of a link error in the secure communication links established during setup, using the procedure used for "Set up and validation for full HMAC with key exchange" as described previously.

The methods, devices, processing, and logic described above may be implemented in many different ways and in many different combinations of hardware and software. For example, electronic circuitry or a controller may be configured with hardware and/or firmware to perform the various functions described. All or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples. The implementations may be distributed as circuitry among multiple system components, such as among multiple processors and memories, optionally including multiple distributed processing systems.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium.

The foregoing description, for purposes of explanation, uses specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications. They thereby enable others skilled in the art to best utilize the invention and various embodiments with various modifications as are suited to the particular use contemplated. The examples are thus illustrative and non-limiting. It is intended that the following claims and their equivalents define the scope of the invention.

What is claimed is:

1. A method for secure communication between components enabling monitoring and control of a power grid system comprising:

receiving, by each flexible alternating current transmission system (FACTS) based component comprising at least an impedance injection modules (IIM) from a local intelligence center (LINC) of the power grid system, an encrypted nonce challenge including an absolute slot number (ASN) that indicates a specific time when the nonce is transmitted by the LINC and an identifier (ID) of the LINC, encrypted based on a seed-key of the IIM;

determining, by the IIM, an elapsed time based on a time when the nonce challenge is received and the ASN;

verifying, by the IIM, an identity of the LINC;

sending, by the IIM in response to determining that the elapse time is less than a pre-set threshold value and the LINC is verified, a response nonce with an ID of the IIM and an encrypted seed-key based authentication value (AV); and establishing, by the IIM with the LINC, a secure connection when the encrypted seed-key based AV and the ID of the IIM are checked and validated by the LINC.

2. The method of claim 1, wherein the encrypted nonce challenge comprising the ID of the LINC and the nonce response comprising the seed-key based AV are generated and encrypted using a seed-key that is unique to the IIM.

3. The method of claim 1, wherein the encryption of the nonce challenge and the response nonce are encrypted based on a unique seed-key assigned to the IIM using one of hash-based message authentication code (HMAC) security protocol with key exchange or an asymmetric key exchange protocol.

4. The method of claim 1, wherein determining the elapsed time comprises:

synchronizing an internal clock of the IIM to a cellular system clock or a global positioning system (GPS) clock that is also synchronized to an internal clock of the LINC.

5. The method of claim 1, wherein verifying the identity of the LINC comprises:

receiving the nonce challenge comprising the ID of the LINC encrypted based on the seed-key of the IIM; and decrypting and verifying the ID of the LINC.

6. The method of claim 1, wherein establishing the secure connection comprises:

generating, by any of the LINC or the IIM, a secure session key; and securely exchanging between IIM and the LINC the secure session key using one of hash-based message authentication code (HMAC) security protocol with key exchange or an asymmetric key exchange protocol.

7. The method of claim 1, wherein establishing the secure connection comprises:

establishing, by the LINC, a secure group key with the IIM, wherein the secure group key is used for secure hop-to-hop communication within the nodes of a mesh group that includes the IIM and the LINC.

8. The method of claim 1, further comprising:

receiving, by the IIM, a recovery key from the LINC after establishing the secure connection with the LINC; and storing the recovery key for use in updating the seed-key with the recovery key for use in reestablishing the secure connection with the LINC in case of a link failure.

9. A method for secure communication between components at nodes of a power grid system, the method comprising:

sending, by a local intelligence center (LINC) to a flexible alternating current transmission system (FACTS) based device at a node comprising at least an impedance injection module (IIM) of the power grid system, a nonce challenge comprising an absolute slot number (ASN) that indicates a specific time when the nonce is transmitted and an 1D-identifier (ID) of the LINC encrypted based on a seed-key of the IIM;

receiving, by the LINC from the IIM, a response nonce with an ID and a cryptographically generated and encrypted seed-key based authentication value (AV);

verifying, by the LINC, the ID and the encrypted seed-key based AV of the IIM; and establishing, between the LINC and the IIM, a secure connection.

10. The method of claim 9, wherein the nonce challenge further comprises a random number and a cryptographically generated and encrypted seed-key based AV.

11. The method of claim 9, wherein the AV in the response nonce is cryptographically generated from the seed-key that is unique to each IIM.

12. The method of claim 9, wherein the encrypted seed-key based AV is encrypted from a unique seed-key assigned to the IIM using one of hash-based message authentication code (HMAC) security protocol with key exchange or an asymmetric key exchange protocol.

13. The method of claim 9, further comprising:
synchronizing an internal clock of the LINC to a cellular system clock or a global positioning system (GPS) clock that is also synchronized to an internal clock of the IIM.

14. The method of claim 9, wherein establishing the secure connection comprises:
exchanging, by the LINC with the IIM, a secure key using one of hash-based message authentication code (HMAC) security protocol with key exchange or an asymmetric key exchange protocol.

15. The method of claim 9, wherein establishing the secure connection comprises:
establishing, by the LINC with the IIM a secure group key, wherein the secure group key is used for secure hop-to-hop communication within a mesh group that includes the LINC and the IIM.

16. The method of claim 9, further comprising:
sending, by the LINC to a plurality of IIMs in a local group that is under supervisory control of the LINC, the nonce challenge;
receiving, by the LINC from each of the plurality of IIMs, a response nonce with an ID and an encrypted seed-key based AV corresponding to each of the plurality of IIMs;
verifying, by the LINC, the ID and the encrypted seed-key based AV corresponding to each of the plurality of IIMs; and
establishing, by the LINC with the plurality of IIMs, a secure connection within the local group.

17. The method of claim 9, further comprising:
sending, by the LINC to the IIM, a recovery key after establishing the secure connection with the IIM, wherein the recovery key of the IIM is for use in reestablishing the secure connection between the LINC and the IIM in case of a link failure or corruption of the seed-key.

18. An apparatus of a power grid system, comprising:
a sensing unit configured to sense changes in power flow of a transmission line of the power grid system;
an impedance injection unit configured to generate and inject impedance into the power line in response to the sensed changes in the power flow of the transmission line;
one or more antennas configured to communicate with components of the power grid system; and
a communication module comprising a processor coupled to the one or more antennas, wherein the processor is configured to:
receive, from a local intelligence center (LINC) of the power grid system, a nonce challenge comprising an absolute slot number (ASN) that indicates a specific time when the nonce is transmitted by the LINC;
determine an elapsed time based on a time when the nonce challenge is received and the ASN;
verify an identity of the LINC;
transmit, in response to a determination that the elapse time is less than a pre-set threshold value and the LINC is verified, a response nonce with an identifier (ID) of the apparatus and a cryptographically generated and encrypted seed-key based authentication value (AV); and
establish with the LINC a secure connection when the encrypted seed-key based AV and the ID of the apparatus are checked and validated by the LINC.

19. The apparatus of claim 18, wherein to establish the secure connection, the processor is further configured to:
generate and exchange secure session keys to use in encrypted communication; and
exchange the secure session keys using one of hash-based message authentication code (HMAC) security protocol with key exchange or an asymmetric key exchange protocol.

20. The apparatus of claim 18, wherein to establish the secure connection, the processor is further configured to:
establish a secure group key with the LINC, wherein the secure group key is used for secure hop-to-hop communication within a mesh group that includes the IIM and the LINC.

21. The apparatus of claim 18, wherein to establish the secure connection, the processor is further configured to:
receive a recovery key from the LINC after the secure connection with the LINC is established;
store the recovery key within the product; and
update a seed-key used to encrypt the AV with the recovery key for use to re-establish the secure connection with the LINC in case of a link failure.

* * * * *